United States Patent [19]

Marrs

[11] 4,204,595
[45] May 27, 1980

[54] ADJUSTABLE CONVEYOR BELT SKIRTBOARD

[75] Inventor: Clinton E. Marrs, Carlsbad, N. Mex.

[73] Assignee: Amax Inc., Greenwich, Conn.

[21] Appl. No.: 961,180

[22] Filed: Nov. 16, 1978

[51] Int. Cl.² .............................................. B65G 21/20
[52] U.S. Cl. ....................................................... 198/836
[58] Field of Search ................. 198/836, 860, 861, 862

[56] References Cited

U.S. PATENT DOCUMENTS

| | | | |
|---|---|---|---|
| 2,205,013 | 6/1940 | Joy | 198/862 |
| 2,593,610 | 4/1952 | Roberts | 198/836 X |
| 2,665,795 | 1/1954 | Holwick | 198/836 |
| 3,024,893 | 3/1962 | Lambert | 198/836 |
| 3,193,077 | 7/1965 | Goldberg | 198/862 |
| 3,499,523 | 3/1970 | Clegg | 198/836 |
| 3,595,379 | 7/1971 | Campbell | 198/861 X |
| 3,989,137 | 11/1976 | Ward | 198/836 |

FOREIGN PATENT DOCUMENTS 2418458  10/1975  Fed. Rep. of Germany ........... 198/836

*Primary Examiner*—James L. Rowland
*Attorney, Agent, or Firm*—Michael A. Ciomek; Donald T. Black

[57] ABSTRACT

A readily adjustable and replaceable skirtboard is provided for a conveyor belt mechanism of the type comprising a movable conveyor belt and a cover housing above the belt which extends along the length of the belt. The skirtboard is pinched against the outside of the cover housing by a clamping bar which extends along the length of the skirtboard, and which is removably held in place by a plurality of spaced apart clamping devices, each secured to the clamping bar and to the cover housing. A clamping device may, for example, comprise a first member secured to the housing, a second member pivotally attached to the first member and also attached to the clamping bar, and a third member passing through a threaded hole in the first member and engaging the second member so as to cause the second member to pivot and force the clamping bar against the skirtboard.

2 Claims, 2 Drawing Figures

ADJUSTABLE CONVEYOR BELT SKIRTBOARD

This invention relates generally to covered conveyor belts, and particularly to conveyor belts used to transport materials which can easily fall off the sides of a conveyor, such as fluid or semi-fluid material, or dry, solid, finely divided material such as ore or earth. The invention relates particularly to conveyor belts having a stationary housing which substantially covers the material borne on the surface of the moving belt, in which the housing is not supported directly by the belt but rather by other supporting structure. Since the housing customarily does not contact the belt surface, it is necessary to provide some sort of barrier to prevent the loss of material from the belt through the space between the belt surface and the lowermost edges of the housing.

STATE OF THE ART

One technique that has been used for providing the necessary barrier against the loss of material from the conveyor belt is the provision of a skirtboard on each side of the belt which is attached to the cover housing and which extends the length of the housing. The bottom edge of the skirtboard directly contacts the upper surface of the moving belt near the outer edges of the belt, thus providing a barrier against the passage of material to the edge of the belt from which the material could be lost. The skirtboard is usually made of rubber or a similar material which should not be so hard that it cuts or abrades the belt. However, the action of the belt rubbing against the edge of the skirtboard leads to wear and erosion of the skirtboard edge, which can create a gap through which material can be lost from the belt. Thus, the skirtboard should be attached to the cover housing in a manner which permits the skirtboard to be adjusted downward toward the belt, so that a fresh edge can be brought into contact with the belt.

In customary use, skirtboards have been held in place in a manner which makes installation, adjustment, and replacement of the skirtboard very inconvenient and time-consuming. Threaded steel studs are placed in a row four to six inches above the belt surface, and are spaced twelve to eighteen inches apart over the full length of the cover housing. A length of skirtboard is then provided with vertical slots which are spaced with respect to each other to match the spacing of the studs, so that the skirtboard can be fitted over the stud ends and can be moved up and down. Lengths of flat steel bar are then drilled with holes the relative spacing of which matches the spacing of the studs, and the drilled bars are placed over the stud ends to hold the skirtboard in place between the housing and the flat steel bar.

This technique of securing the skirtboard to the conveyor belt cover is tedious and wasteful because when a new section of skirtboard is installed, careful measurement of hole sizes and spacing is required to ensure that the holes in the skirtboard sections and in the steel bar sections will be aligned with the stud ends. When a length of skirtboard must be replaced, the time and effort that are necessary for preparing a new skirtboard section require that the conveyor belt be shut down to avoid undue loss of material from the belt.

As indicated above, the skirtboard must periodically be adjusted downward to maintain contact between the bottom edge of the skirtboard and the conveyor belt surface. When the skirtboard is held in place in the manner presently under discussion, downward movement of the skirtboard is limited by the vertical dimension of the slots provided in the skirtboard. It is desirable to provide relatively sizable slots, to permit a number of downward adjustments to be made, but increasing the size of the slots is disadvantageous because it decreases the strength and rigidity of the skirtboard, renders the skirtboard more susceptible to distortion and consequent leaking of material, and shortens the time required for the continually eroding bottom edge of the skirtboard to reach the lowermost portion of the slot in the skirtboard (at which point the skirtboard must be removed and discarded). However, if shorter slots are cut in the skirtboard so as to alleviate these disadvantages, fewer adjustments of the skirtboard may be made before the skirtboard must be removed and either discarded or given a new set of slots. It should also be noted that a slot of any size will always present area through which material may escape from the conveyor belt.

Other developments known in the prior art tend not to address the problems presented by the technique discussed above, and thus furnish little guidance toward solving those problems. For instance, U.S. Pat. No. 2,205,013 discloses a conveyor belt mechanism having plates which rest on the outside edges of the belt and which curve upward and outward to join the sides of the conveyor belt mechanism. The plates are evidently not adjustable or removable, so that over a period of time either the plate or the belt running beneath it would become eroded, perhaps to the point of permitting material to escape off the edges of the belt.

U.S. Pat. No. 3,193,077 discloses a conveyor belt guide rail comprising sections of rail connected together end to end which are also connected to the supporting structure beneath the conveyor belt. There is no indication that the guide rail could perform as a barrier to prevent the loss of finely divided material from the conveyor belt; rather, the apparatus is disclosed for use with belts that convey large, discrete articles such as cans. Further, the rail sections are adjustable only in the direction of travel of the belt.

Neither of these patents shows attachment of the plates or the rail to a cover for the belt. U.S. Pat. No. 3,595,379 discloses a conveyor belt having a cover housing, but the housing is connected by a continuous weld to the frame supporting the belt. Thus, access to the belt from outside the housing is practically impossible. Loss of material from the belt is said to be prevented by flanges which extend upward from each edge of the belt, the flanges being slightly spaced from the inner surfaces of the sides of the cover housing. This arrangement necessarily permits loss of material from the belt into the space between the belt edge and the housing, which could lead to erratic movement and binding of the belt, and excessive wear thereof. Since the cover housing is welded to the supporting structure of the belt, removal of such trapped material and repair of worn portions of the belt would be quite tedious and time-consuming.

SUMMARY OF THE INVENTION

The present invention avoids the problems and difficulties present in previous techniques of providing a barrier for the loss of material through the space which is created above a conveyor belt and below the bottom edges of a cover housing above the belt and positioned between the belt's side edges. A resilient, removable skirtboard which serves as a barrier against the loss of material through the space is held in place as follows. A clamping bar is provided which extends along the skirtboard, above the bottom edge of the cover housing. A plurality of clamping means are secured to the outside of the housing, and the clamping bar is mounted to each of the clamping means so that the bar can pivot transversely with respect to the cover housing. The clamping means are adapted to releasably clamp the skirtboard between the clamping bar and the housing.

DETAILED DESCRIPTION OF THE INVENTION

Figure 1:
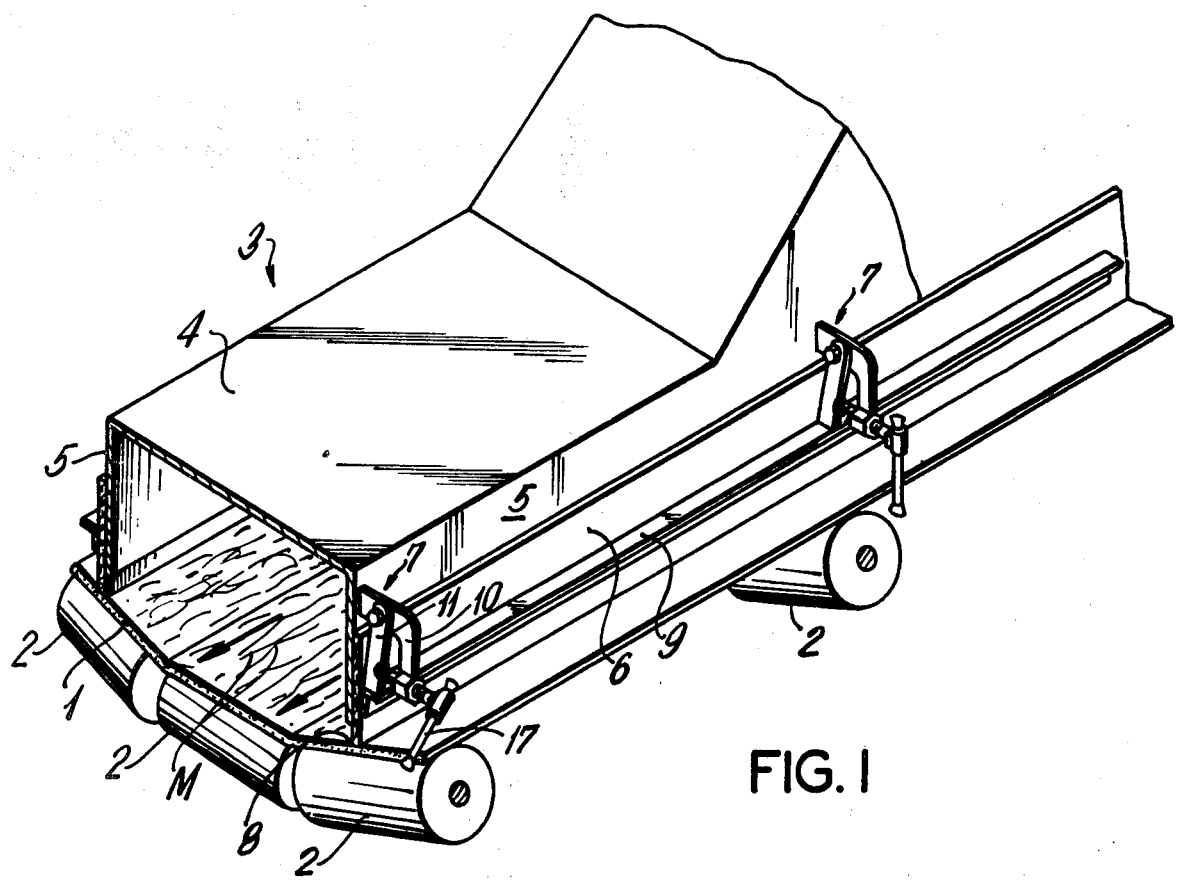
FIG. 1 is a perspective view of a conveyor belt having a cover housing to which a skirtboard has been attached in accordance with the present invention.

With reference to FIG. 1, conveyor belt 1 bearing material M thereon moves in the direction indicated by the arrows. Belt 1 is supported by rollers 2. Rollers 2 may be angled with respect to each other, as depicted, or may be coaxial to support belt 1 in a horizontal position. Cover housing 3 comprises top portion 4 to which are joined substantially vertical side walls 5. It should be understood that cover housing 3 may be curved in shape, and that side walls 5 need not be substantially vertical but may intersect top portion 4 at an obtuse angle. The cover housing depicted is of the type that is positioned between the side edges of belt 1; side walls 5 extend downward toward the surface of belt 1.

A section of skirtboard 6 is shown clamped by clamping means 7 into normal position, i.e. such that the bottom edge 8 of skirtboard 6 is in contact with the upper surface of belt 1, and such that the overlapping surfaces of skirtboard 6 and housing wall 5 are in tight contact. Passage of particles of material M between edge 8 and belt 1, and between housing wall 5 and skirtboard 6, is thereby prevented.

Skirtboard section 6 is clamped against housing wall 5 by clamping bar 9, which runs along the length of skirtboard section 6 and which is attached to several clamping means 7. As can be seen in greater detail in FIG. 2, the clamping effect is obtained by force applied by clamping means 7.

Figure 2:
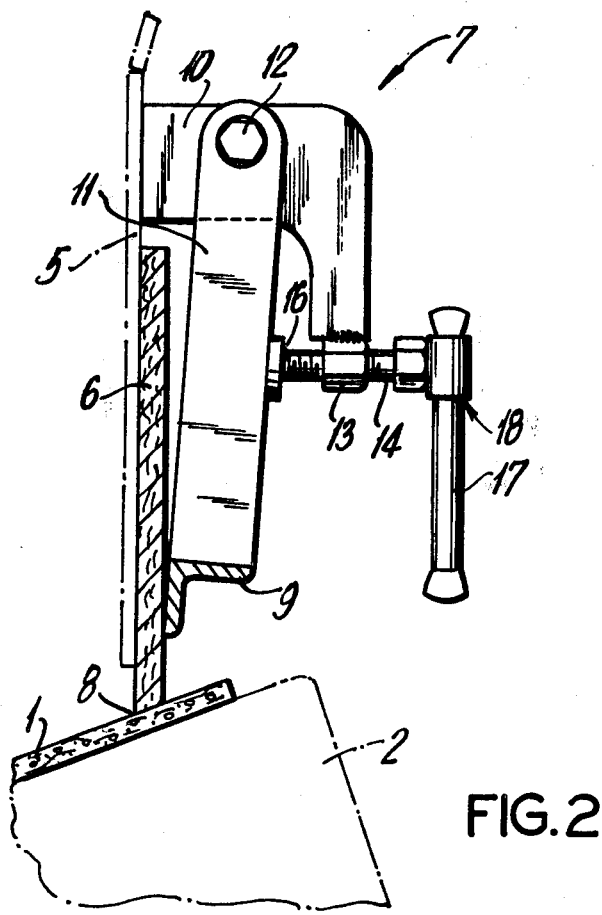
FIG. 2 is a cross-sectional view showing one embodiment of a clamping means as employed in accordance with the present invention.

FIG. 2 shows in cross-section conveyor belt 1, roller 2, cover housing wall 5, skirtboard section 6 and clamping bar 9. As described above, the bottom edge 8 of skirtboard section 6 is in contact with the top surface of belt 1. In addition, clamping bar 9 is held by clamping means 7 against the outside of skirtboard section 6, and clamps skirtboard section 6 against the outside of cover housing wall 5.

The embodiment of the clamping means depicted in FIG. 2 comprises three members which cooperate in the following manner. First member 10 is secured to the housing wall 5, for instance by a weld. Second member 11, to one end of which clamping bar 9 is joined, is pivotally attached at its upper end to member 10 at joint 12, and hangs below first member 10. Second member 11 pivots in a plane which transversely intersects skirtboard 6, preferably at a right angle thereto. First member 10 extends away and downwardly from the point of attachment to the cover housing and ends in threaded hole 13, the axis of which lies in the plane in which second member 11 pivots. Threaded hole 13 may, as in this embodiment, be a conventional nut which has been welded to the end of first member 10, or hole 13 may be formed directly in the end of member 10. Third member 14, which has threading on its surface to match the threading in hole 13, is screwed through hole 13 and is brought to bear against second member 11 at point 16, which is below the point at which second member 11 is attached to first member 10. Third member 14 may be turned by means of a handle, which may be a removable rod or dowel, passing through hole 18 as depicted in FIG. 2. Third member 14 may also simply be grasped and turned by hand or by a wrench or pliers.

When it is desired to loosen skirtboard 6, to adjust it downward into contact with belt 1, or to remove the section completely and replace it with a new section of skirtboard, it is a simple matter to loosen each clamping means holding the skirtboard in place, for instance by turning third member 14 in a direction such that second member 11 pivots away from, and carries clamping bar 9 away from, skirtboard section 6. A new section of skirtboard can then easily be installed by slipping it between housing wall 5 and clamping bar 9, and tightening each clamping means to hold the skirtboard section stationary. Since these operations are carried out entirely outside housing cover 3, and since they can be carried out in a relatively very short period of time, they may be carried out while the belt remains in motion carrying material. This advantage does away with the necessity of shutting down operations connected with the passage of material on belt 1, and thus saves a great deal of time and expense. Of course, if it is desired to shut down the conveyor belt to adjust or replace the skirtboard, the period of down time is much shorter than with present systems employing skirtboard.

The present invention may also be used to hold in place skirtboard sections at areas where a conveyor belt moves around a curve. In such an area, shorter sections of clamping bar should be used, and should be curved to match the curvature of the conveyor belt and associated housing. The curved sections of clamping bar should be secured to one or more clamping means spaced around the curvature of the housing.

The clamping means should be constructed so that the part of each clamping means that is actually secured to a particular clamping bar, such as member 11, should move substantially parallel to the corresponding part of every other clamping means that is also secured to the same clamping bar. It should be recognized that a clamping bar need not be the same length as the section of skirtboard it is adjacent to, and that a section of skirtboard can be held in place by two or more clamping bars (plus associated clamping means) which together extend along substantially the whole length of the skirtboard. It is also possible for parts of one clamping bar to hold portions of separate, abutting sections of skirtboard, although this embodiment is less preferred because it can require releasing the clamping bar from two skirtboard sections even when releasing it from only one section is desired With reference to FIG. 1, the typical spacing between successive clamping means 7 is about 3 feet. Each arm of first member 10 may be about 4 inches long, and the joint between member 10 and cover section 5 can be typically 2 inches. Second member 11 may be a piece of steel bar $\frac{1}{4}$-inch thick, and $1\frac{1}{2}$ inches wide by 8 inches long. Third member 14 may be typically $\frac{1}{2}$-inch in diameter. Clamping bar 9 may be an angle iron which is ¼-inch thick, with arms 1½ inches wide, and as long as desired consistent with the foregoing discussion.

It should be apparent to one skilled in this art that the clamping bar of the present invention will apply substantially uniform force throughout the entire length of the skirtboard, thereby eliminating the risk of leaks of material between adjacent clamping means. In addition, material loss is greatly reduced because the present invention may be used with imperforate skirtboard sections. The absence of holes in the skirtboard sections also prolongs the useful life of the skirtboard, and permits use of a wider skirtboard section and a greater number of downward adjustments of the skirtboard before erosion losses require the installation of a new skirtboard section. The time and effort required to install, adjust, and replace a skirtboard section are also greatly reduced.

Although my invention has been described with reference to one particular embodiment, which should be understood to be the preferred embodiment of my invention, it is understood that modifications and variations of the above description may be practiced without departing from the spirit and scope of my invention. Such modifications and variations are considered to be within the scope of the foregoing description and the following claims.

I claim:

1. In a conveyor belt mechanism for the transport of material comprising a conveyor belt, a cover housing above said belt and between the side edges thereof and having bottom edges above said belt which define spaces through which material may pass, and removable, resilient skirtboards which form a barrier against the passage of material off the side edges of said belt through said spaces, the improvement comprising a clamping bar extending along a skirtboard above the bottom edge of said housing, and a plurality of spaced apart clamping means, each of said clamping means being adapted to releasably clamp said skirtboard between said clamping bar and said housing, said clamping means comprising a first member attached to the outside of said housing, extending away and downwardly from the point of attachment to said housing and terminating in a threaded hole, a second member which is secured at its lower end to said clamping bar and which is pivotally attached at its upper end to said first member so as to hang below said first member and pivot in a plane which transversely intersects said cover housing, the axis of said threaded hole lying in said plane, and a third member threadedly engaging said hole and movable therethrough into and out of abutting engagement against said second member, at a point below the point at which said second member is attached to said first member, such that such second member pivots and causes said clamping bar to hold said skirtboard against said cover housing.

2. The mechanism of claim 1 wherein said skirtboard is imperforate.

* * * * *